United States Patent
Suzuki et al.

(10) Patent No.: US 6,292,663 B1
(45) Date of Patent: Sep. 18, 2001

(54) COMMUNICATION METHOD, TRANSMITTER AND RECEIVER

(75) Inventors: Mitsuhiro Suzuki, Chiba; Kazuyuki Sakoda, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/035,293

(22) Filed: Mar. 5, 1998

(30) Foreign Application Priority Data

Mar. 10, 1997 (JP) .................................................. 09-054486

(51) Int. Cl.[7] .................................................. H04Q 7/20
(52) U.S. Cl. .................................................. 455/447; 370/335
(58) Field of Search .................................. 455/1, 3.1, 5.1, 455/38.1, 62, 63, 447, 448; 370/335, 320

(56) References Cited

U.S. PATENT DOCUMENTS

| | | | |
|---|---|---|---|
| 3,715,508 | * | 2/1973 | Blasbalg .................................. 179/15 |
| 3,833,767 | * | 9/1974 | Wolf .................................. 179/15.55 |
| 4,688,210 | * | 8/1987 | Eizenhofer .................................. 370/18 |
| 5,793,759 | * | 8/1998 | Rakib .................................. 370/342 |
| 5,960,029 | * | 9/1999 | Kim .................................. 375/200 |
| 5,966,376 | * | 10/1999 | Rakib .................................. 370/342 |
| 5,978,413 | * | 11/1999 | Bender .................................. 375/206 |
| 5,983,113 | * | 10/1999 | Asanuma .................................. 455/506 |

* cited by examiner

Primary Examiner—Daniel Hunter
Assistant Examiner—Nick Corsaro
(74) Attorney, Agent, or Firm—Jay H. Maioli

(57) ABSTRACT

The present invention relates to a communication method, and the invention enables it to avoid in advance mistaken restoration of a signal series which is sent in another communication even when the same channel is used in the other communication. An orthogonal matrix which is different for each communication is multiplied with the signal series and sent, and the signal series before orthogonal conversion is restored by multiplying the inverse matrix of the orthogonal conversion which is used on the sending side of the communication partner with the received signal series so that the other communication is performed by using the same channel. Even when the other communication is received, the signal series which is sent in the other communication is not restored even by multiplying the inverse matrix because the orthogonal matrix which is used in the orthogonal conversion is different from the other communication.

52 Claims, 6 Drawing Sheets

COMMUNICATION METHOD, TRANSMITTER AND RECEIVER

BACKGROUND OF THE INVENTION

1. Field of the Invention

This invention relates to a communication method, a transmitter and a receiver, and more particularly, is applicable to radio communication system such as a portable telephone system or the like.

2. Description of the Related Art

In this kind of radio communication system, an area for providing communication service is divided into cells having a desired size and a base station is set as a fixed radio station in the cell. The portable telephone device as a mobile radio station is installed in the cell so that the portable telephone device as a fixed radio station is constituted to be engaged in communication with the base station in the cell in which the portable telephone device is present. At that time, in this kind of radio communication system, the interference problem of an electronic wave is avoided by using a channel of frequency which is different between cells (this is simply referred to as a channel).

By the way, when a different channel is used between adjacent cells in this manner, the problem of interference can be avoided, but at the same time, there arises a disadvantage in that the usage efficiency of the frequency is reduced. As a consequence, in recent years, the interference problem is avoided by changing the channel which is used in each cell at random for each predetermined timing, and the usage efficiency of the frequency is improved.

By the way, in such radio communication system, the channel is only changed at random so that it is not necessarily possible to avoid that the channel becomes the same between adjacent cells. Thus, it is feared that the timing becomes the same. In the case where the same channel is used, there might arise an interference problem in the same manner as the prior art.

For example, as shown in FIG. 1, in the cell 1A, when the portable telephone device 2A uses the predetermined channel to be engaged in communication with the base station 3A, and the same channel as the cell 1A is used in the adjacent cell 1B so that the portable telephone device 2B is engaged in communication with the base station 3B, it sometimes happens that the sending signal CB which is sent by the portable telephone device 2B reaches the base station 3A. In this case, the sending signal CB which reaches the base station 3A becomes an interference wave (so-called hindrance wave) with respect to the sending signal CA which is sent to the base station 3A. In this manner, even when an interference wave I is generated to the sending signal CA in this manner, the signal level of the sending signal CA is larger than the interference wave I, and no considerable problem is generated in normal cases. However, in the case where because, for example, the portable telephone device 2A is distant from the base station 3A and the signal level of the sending signal CA becomes smaller than the interference wave I, the base station 3A receives the interference wave I by mistake instead of the sending signal CA from the portable telephone device 2A. As a consequence, the signal series transmitted by the portable telephone device 2B is restored, and the communication content of the other person is leaked with the result that a situation which is not preferable as a radio communication system might arise. For reference, in such a situation, even when the received data is not obtained as the radio communication system, it is desirable that the interference wave I is not demodulated.

SUMMARY OF THE INVENTION

In view of the foregoing, an object of this invention is to provide a communication method which is capable of avoiding restoring the signal series which is sent in other communication by mistake when the same channel is used in the other communication, and is to provide a transmitter and receiver which use the communication method.

The foregoing object and other objects of the invention have been achieved by the provision of a communication method. In the communication method, the orthogonal conversion is performed by multiplying an orthogonal matrix which is different for each communication with the signal series which is sent, and the signal series to which the orthogonal conversion is performed is sent by using the predetermined channel. On the receiving side, the signal series before the orthogonal conversion is restored by multiplying the inverse matrix of the orthogonal matrix which is used on the sending side of the communication partner with the received signal series.

With the above arrangement, the signal series is multiplied with the orthogonal matrix which is different for each communication and transmitted, and at a receiving side, the received signal series is multiplied with an inverse matrix of the orthogonal matrix used at a transmitting side of the communication partner, so that the signal series before orthogonal conversion is restored. Therefore, even when another communication is performed and received by using the same channel, since the orthogonal matrix used for the orthogonal conversion differs from one communication to another, inverse orthogonal conversion cannot be attained for one communication if an inverse matrix for another communication is multiplied, thereby the signal series sent in another communication is not restored.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
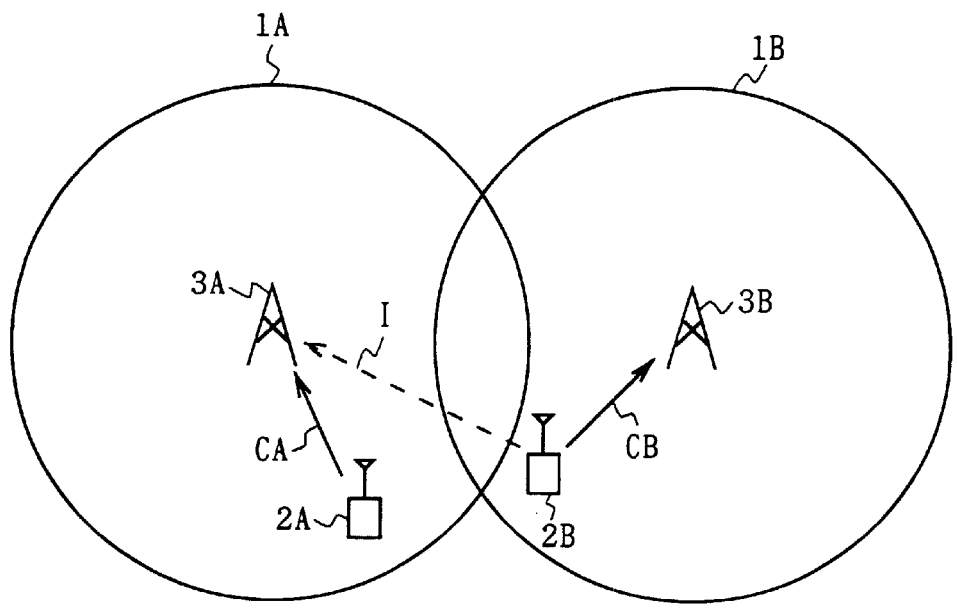
FIG. 1 is a system structure view explaining that the sending signal which is sent by the other communication becomes an interference wave.
Figure 2:
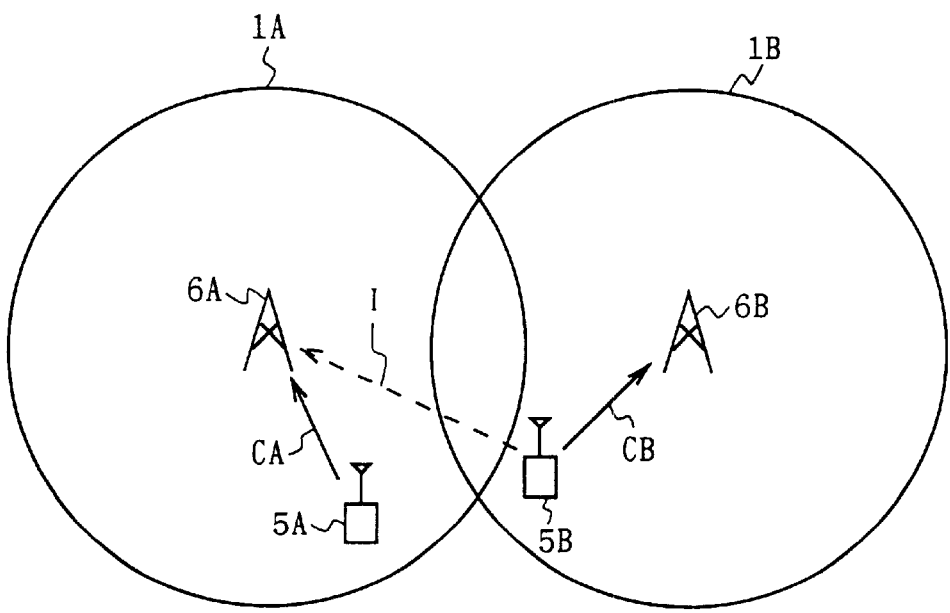
FIG. 2 is a system structural view explaining a principle of the present invention.

Preferred embodiments of this invention will be described with reference to the accompanying drawings:

In the beginning, the principle of the present invention will be explained by using FIG. 2. In FIG. 2, reference numerals 5A, 5B denote the portable telephone device respectively. Reference numeral 6A and 6B denote the base station to which the present invention is applied. As shown in FIG. 2, the portable telephone device 5A uses the predetermined channel to be engaged in radio communication with the base station 6A in the cell 1A. At the same time, the same channel is used in the adjacent cell 1B so that the portable telephone device 5B is engaged in radio communication with the base station 6B. At that time, for example, in the portable telephone devices 5A and 5B both QPSK modulation (Quadrature Phase Shift Keying; Four Phase Transition Modulation) is used as a modulation method of the sent data. The signal series of the modulated sending signal are defined as $x^{(A)}_1, X^{(A)2}, X^{(A)}_3, \ldots X^{(A)}_{k-1}, X^{(A)}_k, X^{(A)}_{k+1}, \ldots$ and $X^{(B)}_1, X^{(B)}_2, X^{(B)}_3, \ldots X^{(B)}_{k-1}, X^{(B)}_k, X^{(B)}_{k+1}, \ldots$ The portable telephone device 5A to which the present invention is applied groups N (N is an integer which is 1 or more) sending signal series $x^{(A)}_n$ (n=1, 2, 3, ...). The grouped sending signal series $x^{(A)}_k, \ldots x^{(A)}_{k+N}$ and a predetermined Nth normal orthogonal matrix $M_A$ are multiplied in order as shown in the following equation.

Equation 1

$$\begin{bmatrix} y^{(A)}_k \\ \vdots \\ y^{(A)}_{k+N} \end{bmatrix} = M_A \begin{bmatrix} x^{(A)}_k \\ \vdots \\ x^{(A)}_{k+N} \end{bmatrix} \quad (1)$$

As a consequence, an orthogonal conversion is added to the sending signal series $x^{(A)}_n$ (n=1, 2, 3, ...) and a resulting sending signal series $y^{(A)}_n$ (n=1, 2, 3, ...) are sent in order.

On the other hand, at the base station 6A which is a receiving side, when a sending signal CA is received from the portable telephone device 5A of the communication partner, N received signal series $y^{(A)}_n$ (n=1, 2, 3, ...) are grouped, and the grouped received signal series $Y^{(A)}_k, \ldots Y^{(A)}_{k+N}$ are successively multiplied with an inverse matrix $M_A^{-1}$ of the Nth normal orthogonal matrix $M_A$ used on the sending side as shown in the following equation.

Equation 2

$$\begin{bmatrix} X^{(A)}_k \\ \vdots \\ X^{(A)}_{k+N} \end{bmatrix} = M_A^{-1} \begin{bmatrix} y^{(A)}_k \\ \vdots \\ y^{(A)}_{k+N} \end{bmatrix} \quad (2)$$

$$= M_A^{-1} M_A \begin{bmatrix} x^{(A)}_k \\ \vdots \\ x^{(A)}_{k+N} \end{bmatrix} = \begin{bmatrix} x^{(A)}_k \\ \vdots \\ x^{(A)}_{k+N} \end{bmatrix}$$

As a consequence, the signal series $X^{(A)}_n$ (n=1, 2, 3, ...) is restored which is equal to the signal series $x^{(A)}_n$ (n=1, 2, 3, ...) before orthogonal conversion.

In the similar manner, at the time of sending data, the portable telephone device 5B groups the N sending signal series $x^{(B)}_n$ (n=1, 2, 3, ...). The grouped sending signal series $x^{(B)}_k, \ldots X^{(B)}_{k+N}$ and the predetermined Nth normal orthogonal matrix $M_B$ are multiplied in order for each group as shown in the following equation.

Equation 3

$$\begin{bmatrix} y^{(B)}_k \\ \vdots \\ y^{(B)}_{k+N} \end{bmatrix} = M_B \begin{bmatrix} x^{(B)}_k \\ \vdots \\ x^{(B)}_{k+N} \end{bmatrix} \quad (3)$$

As a consequence, the orthogonal conversion is added to the sending signal series $x^{(B)}_n$ (n=1, 2, 3, ...), and the resulting sending signal series $y^{(B)}_n$ (n=1, 2, 3, ...) are sent in order. For reference, the Nth normal orthogonal matrix $M_B$ which is used in the portable telephone device 5B and the Nth normal orthogonal matrix $M_A$ which is used in the portable telephone device 5A are matrixes which are completely different from each other.

At the base station 6B which is a receiving side, when the sending signal CB from the portable telephone device 5B of the communication partner is received, the N received receiving signal series $y^{(B)}_n$ (n=1, 2, 3, ...) are grouped, and the grouped $y^{(B)}_k, \ldots y^{(B)}_{k+N}$ and the inverse matrix $M_B^{-1}$ of the Nth normal oryhogonal matrix $M_B$ used at a sending side are multiplied in order for each group as shown in the following equation.

Equation 4

$$\begin{bmatrix} X^{(B)}_k \\ \vdots \\ X^{(B)}_{k+N} \end{bmatrix} = M_B^{-1} \begin{bmatrix} y^{(B)}_k \\ \vdots \\ y^{(B)}_{k+N} \end{bmatrix} \quad (4)$$

$$= M_B^{-1} M_B \begin{bmatrix} x^{(B)}_k \\ \vdots \\ x^{(B)}_{k+N} \end{bmatrix} = \begin{bmatrix} x^{(B)}_k \\ \vdots \\ x^{(B)}_{k+N} \end{bmatrix}$$

Consequently, the signal series $X^{(B)}_n$ (n=1, 2, 3, ...) which is equal to the signal series $x^{(B)}_n$ (n=1, 2, 3, ...) before the orthogonal conversion is restored.

By the way, at the base station 6A, only the sending signal CA sent by the portable telephone device 5A reaches, but the sending signal CB sent by the portable telephone device 5B also reaches depending on the situation. In that case, the sending signal CB from the portable telephone device 5B acts as an interference wave I. When the signal level of the sending signal CB is large as compared with the sending signal CA from the portable telephone device 5A, trouble is caused to communication with the portable telephone device 5A. In other words, at the base station 6A, it is not recognized that the signal is a sending signal from which of the portable telephone devices 5A or 5B so that it is feared that the sending signal CB from the portable telephone device 5B is received by mistake.

In such a case, the base station 6A groups the N received signal series $y^{(B)}_n$ (n=1, 2, 3, ...) received from the portable telephone device 5B so that the demodulation processing is performed by multiplying the inverse matrix $M_A^{-1}$ with the grouped signal series $y^{(B)}_k, \ldots y^{(B)}_{k+N}$ as shown in the following equation as in the normal receiving processing.

Equation 5

$$\begin{bmatrix} X^{(A)}_k \\ \vdots \\ X^{(A)}_{k+N} \end{bmatrix} = M_A^{-1} \begin{bmatrix} y^{(B)}_k \\ \vdots \\ y^{(B)}_{k+N} \end{bmatrix} \quad (5)$$

-continued $$= M_A^{-1} M_B \begin{bmatrix} x_k^{(B)} \\ \vdots \\ x_{k+N}^{(B)} \end{bmatrix}$$

However, as seen from the equation (5), the receiving signal series $y^{(B)}_n$ (n=1, 2, 3, . . . ) from the portable telephone device 5B is a result obtained from a multiplication of the orthogonal matrix $M_B$ which is different from the orthogonal matrix $M_A$ so that the diagonal reverse conversion is not obtained even when the inverse matrix $M_A^{-1}$ is multiplied with the result that the original signal series $x^{(B)}_n$ (n=1, 2, 3, . . . ) is not restored. In this case, the received signal series becomes a signal series which is the original signal series $x^{(B)}_n$ (n=1, 2, 3, . . . ) orthogonally converted with another orthogonal matrix consisting of $M_A^{-1}M_B$, so that the signal becomes ostensibly a noise signal, and even when the signal series is QPSK demodulated, the sending data of the portable telephone device 5B is not restored.

In this manner, in the case of the radio communication system to which the present invention is applied, the orthogonal matrix which is different for each communication at the sending side is multiplied with the signal series. On the receiving side, the received signal series is multiplied with the inverse matrix of the orthogonal matrix which is used on the sending side (namely, the communication partner of its own station) so that the original signal series before the orthogonal conversion is restored. As a consequence, even when the same channel is used in the other communication, the restoration of the sent signal series by the other communication is avoided in advance with the result that the leakage of the data sent in the other communication can be avoided in advance.

For reference, there is described here that the leakage problem is avoided when the sending signal CB of the portable telephone device 5B is received by the base station 6A. For the same reason, the leakage problem can be also avoided even when the base station 6B receives the sending signal CA of the portable telephone device 5A.

Figure 3A:
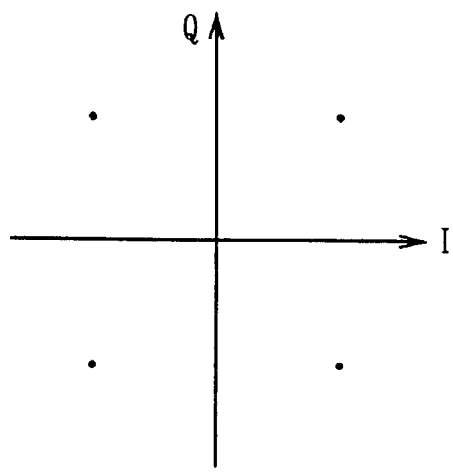
FIGS. 3A to 3C are signal transition views explaining an operation at the time of receiving a sending signal from the communication partner in a radio communication system to which the present invention is applied.
Figure 3B:
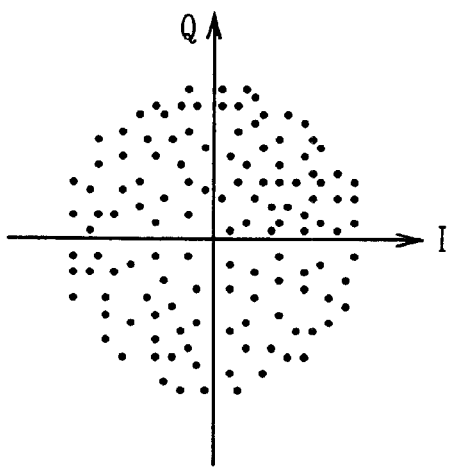

Here, the orthogonal conversion using the orthogonal matrix and the inverse conversion thereof will be explained by using the signal transition view. In the beginning, the sending signal series $x^{(A)}_n$ (n=1, 2, 3, . . . ) of the portable telephone device 5A is QPSK modulated so that the π/4, 3π/4, 5π/4 or 7π/4 phase states can be assumed. As a consequence as shown in FIG. 3A, on the complex surface (IQ surface), the phase state is present at a position where the phase state becomes π/4, 3π/4, 5π/4 or 7π/4. When such sending signal series $x^{(A)}_n$ (n=1, 2, 3, . . . ) is multiplied to the Nth normal orthogonal matrix $M_A$, the resulting signal series $y^{(A)}_n$ (n=1, 2, 3, . . . ) becomes a random state as shown in FIG. 3B.

Figure 3C:
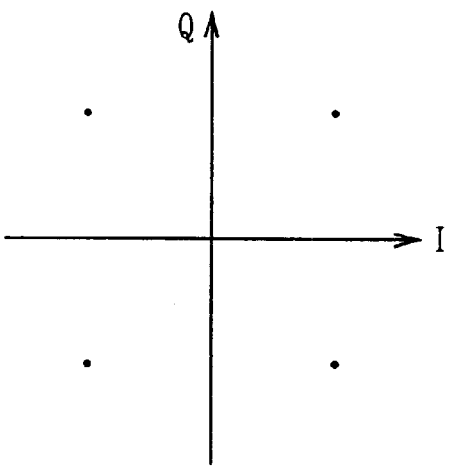

On the other hand, at the base station 6A which is a receiving side, this signal series $y^{(A)}_n$ (n=1, 2, 3, . . . ) is received. As described above, when the inverse matrix $M_A^{-1}$ of the orthogonal matrix $M_A$ which is used on the sending side is multiplied with this signal series $Y^{(A)}_n$ (n=1, 2, 3, . . . ), the resulting signal series $X^{(A)}_n$ (n=1, 2, 3, . . . ) becomes the same as the original signal series $x^{(A)}_n$ (n=1, 2, 3, . . . ) as shown in FIG. 3C so that the resulting signal series is brought back to the position of the phase state comprising π/4, 3π/4, 5π/4 or 7π/4 on the complex surface. Consequently, when the signal series $X^{(A)}_n$ (n=1, 2, 3, . . . ) is subjected to QPSK demodulation, the sending data from the portable telephone device 5A can be accurately restored.

Figure 4A:
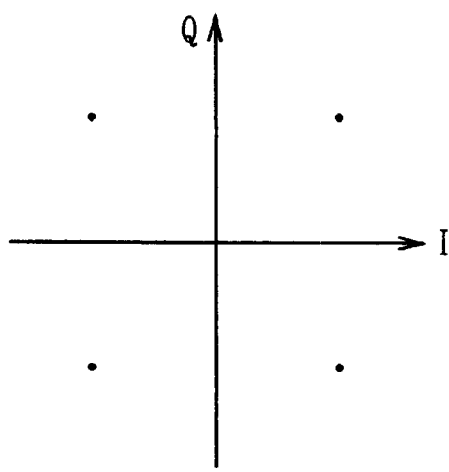
FIGS. 4A to 4C are signal transition views explaining an operation at the time of receiving an interference wave in the radio communication system.
Figure 4B:
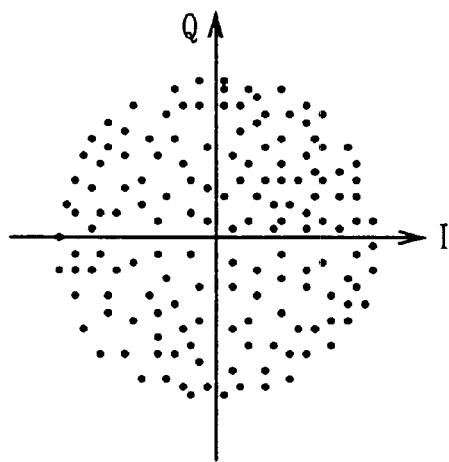

Furthermore, since the sending signal series $x^{(B)}_n$ (n=1, 2, 3, . . . ) of the portable telephone device 5B is also QPSK modulated, π/4, 3π/4, 5π/4 or 7π/4 phase state is assumed with the result that the phase is present on the position comprising π/4, 3π/4, 5π/4 or 7π/4 on the complex surface as shown in FIG. 4A. When such sending signal series $x^{(B)}_n$ (n=1, 2, 3, . . . ) is multiplied with Nth normal orthogonal matrix $M_B$, the resulting signal series $y^{(A)}_n$ (n=1, 2, 3, . . . ) is such that the phase state becomes random as shown in FIG. 4B.

Figure 4C:
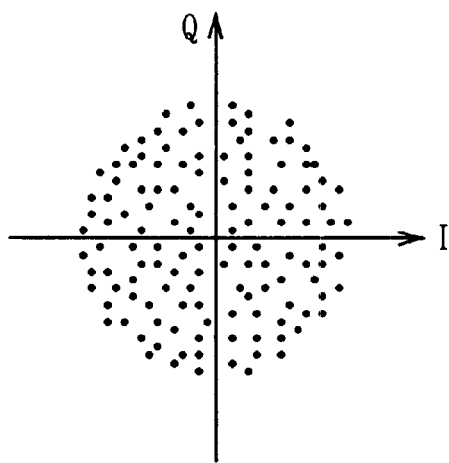

In the case where such signal series $y^{(B)}_n$ (n=1, 2, 3, . . . ) is received at the base station 6A which is not the communication partner, the signal series $y^{(B)}_n$ (n=1, 2, 3, . . . ) becomes an interference wave for the base station 6A. However, the base station 6A does not recognize that the signal series is either the sending signal from the communication partner or the interference wave and, the demodulation processing is performed as in the normal receiving processing. However, even when the inverse matrix $M_A^{-1}$ of the orthogonal matrix $M_A$ is multiplied with this signal series $y^{(B)}_n$ (n=1, 2, 3, . . . ), the inverse matrix $M_A^{-1}$ is not the inverse matrix of the orthogonal matrix $M_B$ which is used at the sending time. As shown in FIG. 4C, the phase state is not brought back to the original state so that the phase state becomes a random state. Consequently, even when the signal series shown in FIG. 4C is QPSK demodulated, the sending data from the portable telephone device 5B is not restored. Consequently, the leakage of the data sent by the other communication can be avoided, and the generation of the undesirable state as a radio communication system can be avoided.

Figure 5:
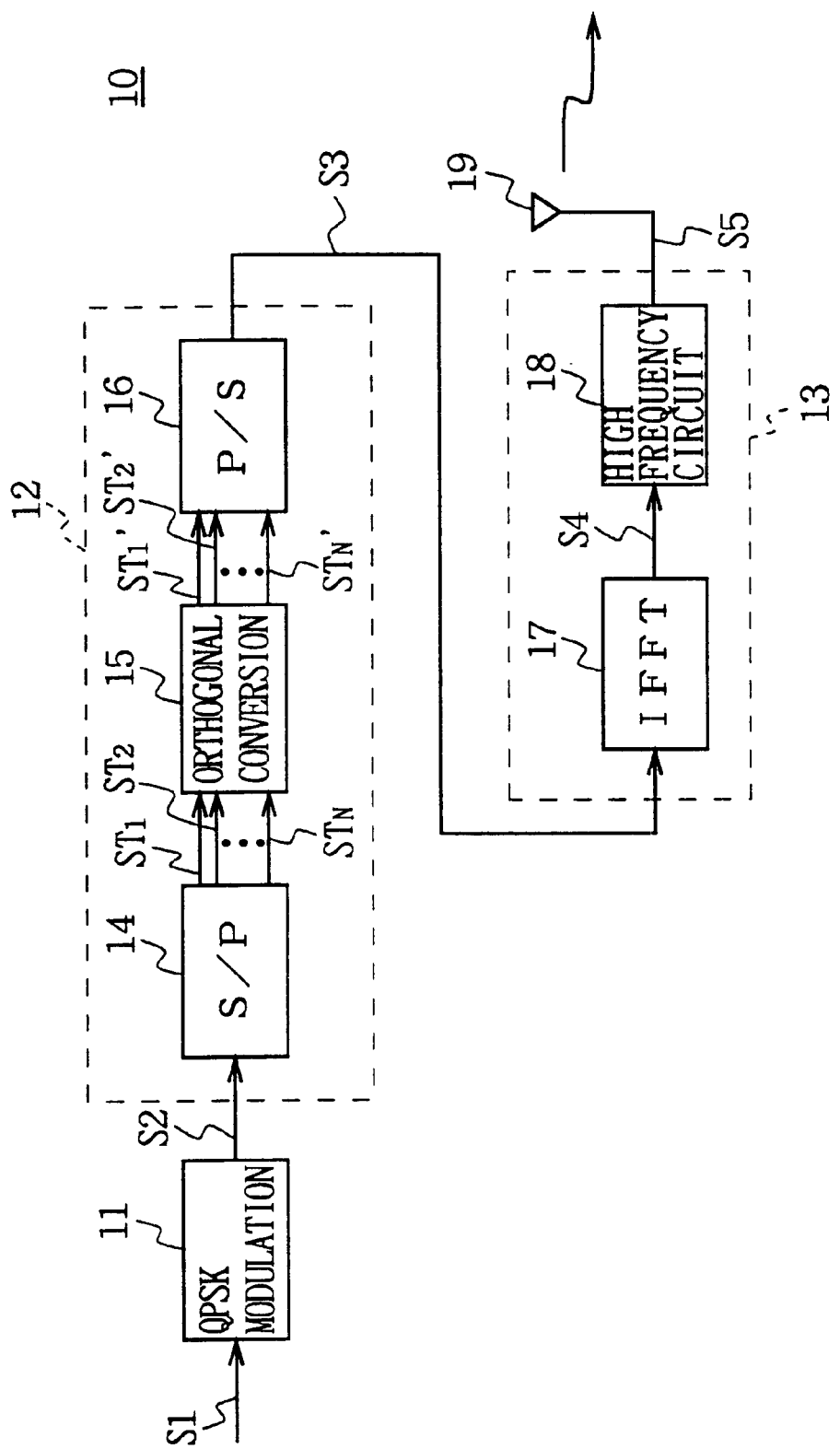
FIG. 5 is a block view showing a structure of a transmitter provided in the portable telephone set.

Here, a concrete structure of the portable telephone device 5A (or 5B) and the base station 6A (or 6B) to which such principle is applied will be explained hereinbelow. In the beginning, the portable telephone device 5A (or 5B) has the transmitter 10 shown in FIG. 5. This transmitter 10 roughly comprises a QPSK modulation circuit 11, an orthogonal conversion part 12, and a sending part 13 so that the sent data S1 supplied via the predetermined noise processing circuit or the like is input to the QPSK modulation circuit 11 in the beginning. The QPSK modulation circuit 11 converts the sent data S1 into a sending signal series S2 of the phase data by performing the QPSK modulation processing on the sent data S1 so that the sending signal series S2 is output to a serial/parallel conversion circuit (S/P) 14 of the orthogonal conversion part 12. For reference, this sending signal series S2 corresponds to the aforementioned signal series $x^{(A)}_n$ (n=1, 2, 3, . . . ) (or $x^{(B)}_n$ (n=1, 2, 3, . . . )).

The serial/parallel conversion circuit 14 is a circuit for grouping N groups of the sending signal series S2 so that the sent signal series which is input is N parallel signal by dividing the input signal series S2 into N signals and the resulting parallel signal series $ST_1$ through $ST_N$ is output to an orthogonal conversion circuit 15.

The orthogonal conversion circuit 15 is a circuit for adding an orthogonal conversion to the sending signal series by using a predetermined Nth normal orthogonal matrix. The parallel signal series $ST_1$ through $ST_N$ are defined as one group and Nth normal orthogonal matrix is multiplied in order, and each group of signal series $ST_1$ through $ST_N$ are subjected to an orthogonal conversion. At that time, the orthogonal conversion circuit 15 searches for a matrix which is completely different from the Nth normal orthogonal matrix which is used in the other communication, and the matrix is not used for the orthogonal conversion, and a matrix which is selected at random from the Nth normal orthogonal matrixes which are present in plurality. This is because when an attempt is made to search for a matrix which is completely different from the Nth normal orthogonal matrix which is used in the other communication, it is necessary to inspect a matrix which is used in the other communication with the result that the selection processing of the orthogonal matrix for the processing becomes complicated. As a consequence, this orthogonal conversion circuit 15 obtains a matrix ostensibly different from the matrix which is used in the other communication by selecting at random a matrix out of the Nth normal orthogonal matrixes which are present in plurality so that the matrix selection processing is simplified.

Here, a method for selecting the Nth normal orthogonal matrix will be concretely explained. In the orthogonal conversion circuit 15, for example N Nth Walsh vectors are prepared as the Nth diagonal vector whose vector components comprise two values. The orthogonal conversion circuit 15 gives a random phase rotation to this Nth Walsh vector respectively so that the Nth random normal orthogonal matrix is generated by combining the random phase rotation. In other words, as shown in the following equation, Equation 6

$$M = \frac{1}{\sqrt{N}} \begin{bmatrix} e^{jZ1}w_1^T \\ e^{jZ2}w_2^T \\ \vdots \\ e^{jZN}w_N^T \end{bmatrix} \quad (6)$$

a random phase rotation is given to the Walsh vectors $W_1$, $W_2, \ldots W_N$ by multiplying random phase rotation components $e^{jZ1}, e^{jZ2}, \ldots e^{jZN}$ (here Z1 through ZN denote phase rotation angles) to Nth Walsh vectors $W_1, W_2, \ldots W_N$. Then, $1/\sqrt{N}$ is multiplied so that a random Nth normal orthogonal matrix M is generated. However, in the equation (6), $W_1^T$, $W_2^T, \ldots W_N^T$ is what is vector placed so as to have a vector component in a line direction of the Walsh vectors $W_1$, $W_2, \ldots W_N$ having vector component in the row direction.

By using such selection method, the orthogonal conversion circuit 15 selects the Nth normal orthogonal matrix and multiplies it with the parallel signal series $ST_1$ through $ST_N$ so that the orthogonal conversion is added to the signal series $ST_1$ through $ST_N$. The resulting parallel signal series $ST_1'$ through $ST_N'$ are output to a parallel/serial conversion circuit (P/S) 16.

The parallel/serial conversion circuit 16 is a circuit for collecting grouped sending signal series into one group by converting a parallel signal into a serial signal so that the parallel signal series $ST_1'$ through $ST_N'$ which are input are converted into a serial signal series S3, which is output to a reverse Fourier conversion circuit (IFFT) 17 at the sending part 13. For reference, this signal series S3 corresponds to the aforementioned signal series $y^{(A)}_{NA}$ (n=1, 2, 3, ... ) or $y^{(B)}_{n}$ (n=1, 2, 3, ... ).

The reverse Fourier conversion circuit 17 dissipates and overlaps the signal series S3 with a plurality of multiple carriers having different frequencies by adding a reverse Fourier conversion to the signal series S3. Then the resulting sending signal S4 is output to a high frequency circuit 18. The high frequency circuit 18 converts this sending signal S4 into a predetermined channel of sending signal S5 in frequency. At the same time, after the sending signal S5 is amplified to a predetermined power, the sending signal is sent via an antenna 19. For reference, the high frequency circuit 18 changes at random the channel of the sending signal S5 for each of the predetermined timing (so-called frequency hopping is performed). As a consequence, the usage efficiency of the frequency is improved while avoiding the situation that the channel becomes the same as the other communication.

Figure 6:
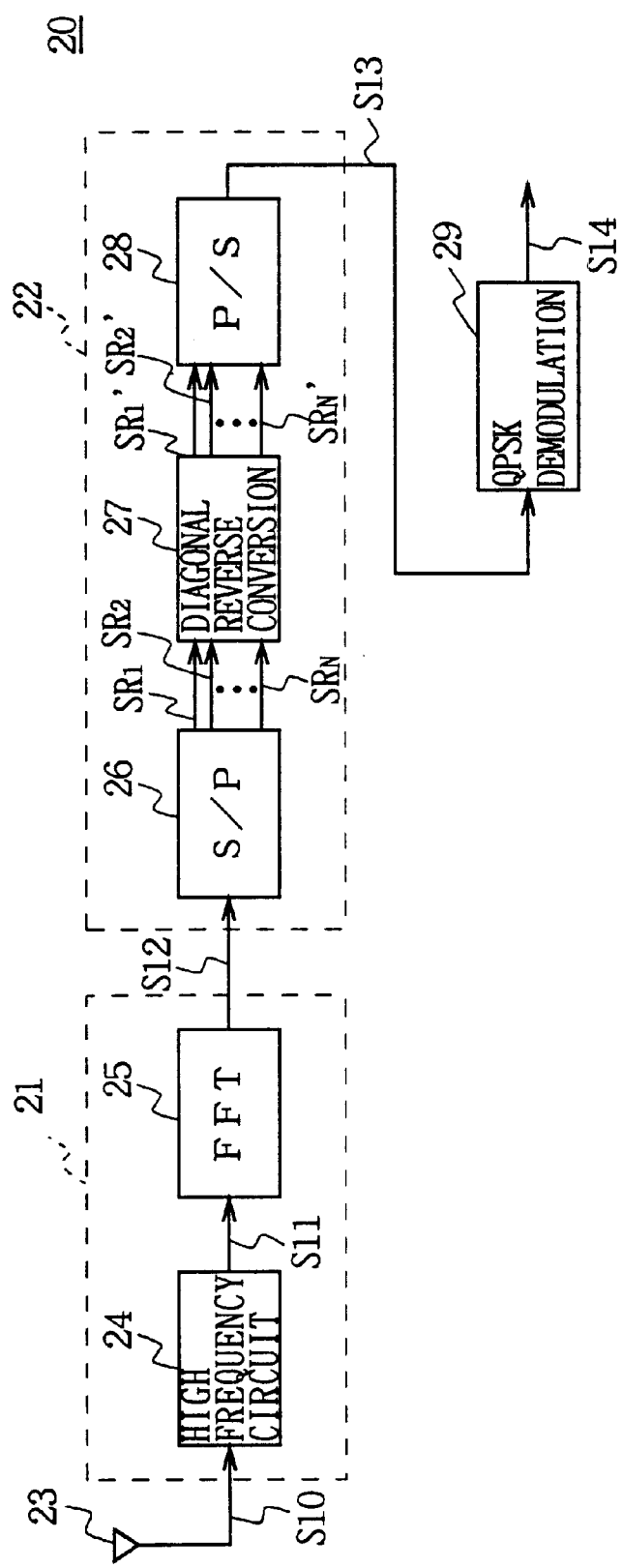
FIG. 6 is a block view showing a structure of a receiver provided in the station.
Figure 7:
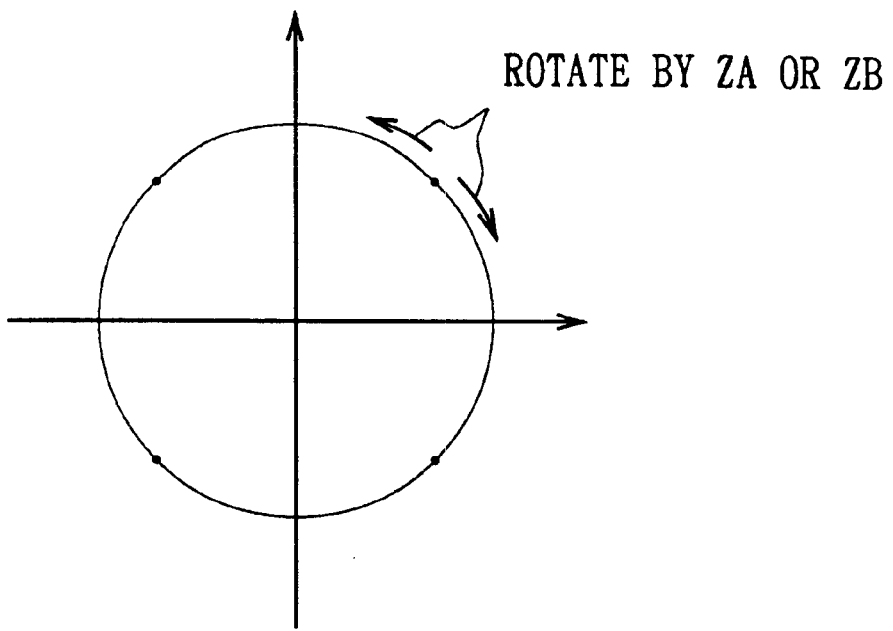
FIG. 7 is a signal transition view explaining an orthogonal conversion at the time of using the first dimension orthogonal matrix.

In contrast, the base station 6A (or 6B) has a receiver 20 as shown in FIG. 6. This receiver 20 roughly comprises a receiving part 21, an orthogonal conversion part 22, and a QPSK demodulation circuit 29. The signal S10 received via the antenna 23 is input to a high frequency circuit 24 of the receiving part 21. The high frequency circuit 24 amplifies the sending signal S10 to a predetermined power, and at the same time, the received signal S10 is converted into a received signal S11 of a base band, and the received signal is output to the Fourier conversion circuit (FFT) 25. The Fourier conversion circuit 25 extracts a signal series S12 which is dissipated and overlapped with the a plurality of multiple carriers by adding the Fourier conversion to the receiving signal S11 and the extracted signal is output to a serial/parallel conversion circuit (S/P) 26 of the diagonal reverse conversion part 22. For reference, this signal series S12 corresponds to the aforementioned signal series $y^{(A)}_n$ (n=1, 2, 3, ... ) (or $y^{(B)}_n$ (n=1, 2, 3, ... )).

The serial/parallel conversion circuit 26 is a circuit for dividing the signal series S12 into groups comprising N signal series, and the circuit converts the signal series into N parallel data by dividing input signal series S12 into groups comprising N signal series and the resulting parallel signal series $SR_1$ through $SR_N$ are output to a diagonal reverse conversion circuit 27.

The diagonal reverse conversion circuit 27 is a circuit for performing diagonal reverse conversion by using an inverse matrix of Nth normal orthogonal matrix which is used by the orthogonal conversion circuit 15 of the communication partner. The diagonal reverse conversion circuit adds the diagonal reverse conversion for each group with respect to the signal series $SR_1$ through $SR_N$ by multiplying the inverse matrix in order by defining the input parallel signal series $SR_1$ through $SR_N$ as one group. The resulting signal series $SR_1'$ through $SR_N'$ is output to a parallel/serial conversion circuit (P/S) 28. For reference, the diagonal reverse conversion circuit 27 recognizes Nth normal orthogonal matrix which is used on the sending side by receiving processing or the like of the control signal, for example, at the time of the start of the communication.

The parallel/serial conversion circuit 28 is a circuit for collecting received signal series which is grouped into one group by converting the parallel signal into a serial signal. The input parallel signal series $SR_1'$ through $SR_N'$ are converted into a serial signal series S13. And this signal series S13 is output to a QPSK modulation circuit 29. For reference, this signal series S13 corresponds to the aforementioned signal series $X^{(A)}_n$ (n=1, 2, 3, ... ) (or $X^{(B)}_n$ (n=1, 2, 3, ... )). The QPSK modulation circuit 29 restores the received data S14 from the signal series S13 which is phase data by performing a predetermined demodulation processing such as, for example, diagonal delay wave detection to the QPSK modulated signal series S13. In this manner, the received data S14 which is the same as the sent data S1 on the sending side is restored on the receiving side.

For reference, bi-direction communication is performed between the portable telephone device 5A (or 5B) and the base station 6A (or 6B) so that the portable telephone device 5A (or 5B) is provided with a receiver which is approximately the same as the aforementioned receiver 20. In the similar manner, the base station 6A (or 6B) is provided with a transmitter which is approximately similar to the aforementioned transmitter 10.

In the aforementioned structure, in the case of this radio communication system, the orthogonal conversion is applied to the signal series by multiplying the Nth normal orthogonal matrix which is different for each communication to the signal series which is QPSK modulated at the time of sending the signal, and the orthogonally converted signal series is sent. On the other hand, on the receiving side, the diagonal reverse conversion is applied to the signal series by multiplying the inverse matrix of the Nth normal orthogonal matrix which is used on the sending side of the communication partner with the signal series which has been received and the signal series which is subjected to the reverse conversion is subjected to QPSK demodulation. For example, in the portable telephone device 5A which is shown in FIG. 2, the signal series $x^{(A)}{}_n$ (n=1, 2, 3, . . . ) is subjected to the orthogonal conversion by multiplying the Nth normal orthogonal matrix $M_A$ with the signal series $x^{(A)}{}_n$ (n=1, 2, 3, . . . ) to be sent so that the signal series $y^{(A)}{}_n$ (n=1, 2, 3, . . . ) which is subjected to the orthogonal conversion is sent. Furthermore, in the portable telephone device 5B, the signal series $x^{(B)}{}_n$ (n=1, 2, 3, . . . ) is subjected to the orthogonal conversion by multiplying the Nth normal orthogonal matrix $M_B$, which is different from the orthogonal matrix $M_A$ with the signal series $x^{(B)}{}_n$ (n=1, 2, 3, . . . ) to be sent with the result that the signal series $y^{(B)}{}_n$ (n=1, 2, 3, . . . ) which is subjected to the orthogonal conversion is sent.

By the way, in the case where the base station 6A receives the sending signal CA from the portable telephone device 5A which is a communication partner, the inverse matrix $M_A^{-1}$ of the orthogonal conversion $M_A$ is multiplied with the received signal series $y^{(A)}{}_n$ (n=1, 2, 3, . . . ) with the result that the original signal series $x^{(A)}{}_n$ (n=1, 2, 3, . . . ) can be accurately restored and the sent data sent by the portable telephone device 5A with QPSK demodulation can be accurately restored.

On the other hand, in the case where the base station 6A receives the sending signal CB from the portable telephone device 5B, the original signal series $x^{(B)}{}_n$ (n=1, 2, 3, . . . ) is not restored even when the inverse matrix $M_A^{-1}$ is multiplied with the received signal series $y^{(B)}{}_n$ (n=1, 2, 3, . . . ), because the inverse matrix $M_A^{-1}$ is not an inverse matrix of the orthogonal matrix $M_B$ which is used on the sending side. In this case, when the inverse matrix $M_A^{-1}$ is multiplied, the matrix comprising $M_A^{-1} M_B$ multiplied with the signal series $x^{(B)}{}_n$ (n=1, 2, 3, . . . ) is the product so that the signal series becomes random and looks ostensibly like a noise signal with the result that the original sent data is not restored even when the QPSK demodulation is performed temporarily.

In this manner, this radio communication system multiplies the orthogonal matrix which is different for each communication to the signal series on the sending side and sends it, while the system multiplies the inverse matrix of the orthogonal matrix which is used at the sending side of the communication partner with the received signal series on the receiving side and the original signal series is restored with the result that the same channel is used in the other communication. Even when the signal series is received, the orthogonal matrix which is used at the sending time is different from the other communication so that the diagonal reverse conversion is not realized by multiplying the inverse matrix, and the signal series which is sent in the other communication is not restored. As a consequence, the leakage of the sent data which is sent in the other communication can be avoided in advance.

Furthermore, in the case of the radio communication system, a completely different Nth normal orthogonal matrix is not selected by examining the Nth normal orthogonal matrix which is used in the other communication at the time of selecting the Nth normal orthogonal matrix in the orthogonal conversion circuit 15. In actuality, the matrix which is different from the matrix which is used in the other communication is selected by selecting the orthogonal matrix at random out of the Nth normal orthogonal matrixes which are present in plurality. Consequently, a process of examining the matrix which is used in the other communication becomes unnecessary so that a selection processing of the orthogonal matrix can be simplified. Also, depending on the situation, an orthogonal matrix to be used is assigned to each base station in advance, and the terminal station may select the orthogonal matrix to be used in accordance with the base station with which the communication is performed.

Furthermore, in the case of the radio communication system, a plurality of orthogonal matrixes are not prepared in advance at the time of selecting the orthogonal matrix. In actuality, N Nth Walsh vectors are prepared in advance, and random phase rotation is given to the Walsh vectors $W_1$, $W_2$, . . . $W_N$ so that Nth normal orthogonal matrix is obtained by combining the Walsh vectors $W_1$, $W_2$, . . . $W_N$. Consequently, the calculation part for calculating the normal orthogonal matrix is constituted with addition and subtraction processing, and at the same time, a memory for memorizing a plurality of orthogonal matrixes becomes unnecessary and the normal orthogonal matrix can be calculated with a simple structure.

For reference, Nth normal orthogonal matrix which is calculated by using the Walsh vector is shown here as a reference. For example, when N=1 is set, and random rotation angles which are selected by the portable telephone devices 5A and 5B are set to ZA and ZB, the Walsh vector becomes '1' at the time of N=1 with the result that the normal orthogonal matrixes $M_A$ and $M_B$ generated in the portable telephone device 5A and 5B are shown in the following equation.

Equation 7

$$M_A = e^{jZA}, \quad M_B = e^{jZB} \tag{7}$$

For reference, when the normal orthogonal matrixes $M_A$ and $M_B$ are used, it means that the signal series having a phase state which is set to $\pi/4$, $3\pi/4$, $5\pi/4$ or $7\pi/4$ on the complex surface is rotated in a predetermined direction by phase rotation angles ZA and ZB. Incidentally, in this case, when the base station 6A receives the sending signal from the portable telephone device 5B which is the other communication, the matrix which is shown in the following equation is multiplied with the signal series $x^{(B)}{}_n$ (n=1, 2, 3, . . .).

Equation 8

$$M_A^{-1} M_B = e^{j(ZB-ZA)} \tag{8}$$

It can be seen that when the phase rotation angles ZA and ZB are different, the signal series $x^{(B)}{}_n$ (n=1, 2, 3, . . . ) which is sent in the other communication is not restored.

Furthermore, the N=2 is set, and random phase rotation angles which are selected by the portable telephone devices 5A and 5B are set to ZA1, ZA2, ZB1 and ZB2 respectively. A vector shown in the following equation is used as the line displacement vectors $W_1^T$ and $W_2^T$ of the second Walsh vectors $W_1$ and $W_2$.

Equation 9

$$W_1^T = (1, 1), \quad W_2^T = (1, 1) \tag{9}$$

Then, the normal orthogonal matrixes $M_A$ and $M_B$ which are generated in the portable telephone devices 5A and 5B are shown in the following equation.

Equation 10

$$\begin{cases} M_A = \dfrac{1}{\sqrt{2}} \begin{bmatrix} e^{jZA1} & 0 \\ 0 & e^{jZA2} \end{bmatrix} \begin{bmatrix} 1 & 1 \\ 1 & -1 \end{bmatrix} \\ M_B = \dfrac{1}{\sqrt{2}} \begin{bmatrix} e^{jZB1} & 0 \\ 0 & e^{jZB2} \end{bmatrix} \begin{bmatrix} 1 & 1 \\ 1 & -1 \end{bmatrix} \end{cases} \quad (10)$$

Incidentally, in this case, when the base station 6A receives the sending signal from the portable telephone device 5B which is the other communication, the state is obtained that the signal series $x^{(B)}_n$ (n=1, 2, 3, . . . ) is multiplied with the matrix shown in the following equation.

Equation 11

$$\begin{aligned} M_A^{-1} M_B &= \frac{1}{2} \begin{bmatrix} 1 & 1 \\ 1 & -1 \end{bmatrix} \begin{bmatrix} e^{-jZA1} & 0 \\ 0 & e^{-jZA2} \end{bmatrix} \begin{bmatrix} e^{jZB1} & 0 \\ 0 & e^{jZB2} \end{bmatrix} \begin{bmatrix} 1 & 1 \\ 1 & -1 \end{bmatrix} \\ &= \frac{1}{2} \begin{bmatrix} 1 & 1 \\ 1 & -1 \end{bmatrix} \begin{bmatrix} e^{j(ZB1-ZA1)} & 0 \\ 0 & e^{j(ZB2-ZA2)} \end{bmatrix} \begin{bmatrix} 1 & 1 \\ 1 & -1 \end{bmatrix} \\ &= \frac{1}{2} \begin{bmatrix} 1 & 1 \\ 1 & -1 \end{bmatrix} \begin{bmatrix} e^{j(ZB1-ZA1)} & e^{j(ZB1-ZA1)} \\ e^{j(ZB2-ZA2)} & -e^{j(ZB2-ZA2)} \end{bmatrix} \\ &= \frac{1}{2} \begin{bmatrix} e^{j(ZB1-ZA1)} + e^{j(ZB2-ZA2)} & e^{j(ZB1-ZA1)} - e^{j(ZB2-ZA2)} \\ e^{j(ZB1-ZA1)} - e^{j(ZB2-ZA2)} & e^{j(ZB2-ZA2)} + e^{j(ZB2-ZA2)} \end{bmatrix} \end{aligned} \quad (11)$$

It can be seen that when the phase rotation angles ZA1 and ZB1 and the phase rotation angles ZA2 and ZB2 are different from each other, the signal series $x^{(B)}_n$ (n=1, 2, 3, . . . ) which is sent in the other communication is not restored.

Thus, in the aforementioned structure, the sending side multiplies and sends the orthogonal matrix which is different from each other for each communication to the signal matrix, and the receiving side restores the original signal series before the orthogonal conversion by multiplying the inverse matrix of the orthogonal matrix used by the sending side of the communication partner with the received signal series with the result that the same channel is used in the other communication. Even when the same channel is received, the mistaken restoration of the signal series which is sent in the other communication can be avoided in advance, and the leakage of the sent data which is sent in the other communication can be avoided in advance.

Incidentally, in the aforementioned embodiment, there is described a case in which N Nth Walsh vectors are prepared at the time of selecting the orthogonal matrix, respective random phase rotation is given to the Walsh vector, and the Walsh vector to which the phase rotation is given is combined thereby generating more random orthogonal matrix. However, the present invention is not limited thereto. The same advantage as described above can be obtained by generating more random orthogonal matrix by arranging each vector component of the predetermined orthogonal matrix at random.

Furthermore, in the aforementioned embodiment, there is described a case in which normalized orthogonal matrix is used as the orthogonal matrix. However, the present invention is not limited thereto. An arbitrary orthogonal matrix which is not normalized may be used. In summary, the same advantage as described above can be obtained by using any orthogonal matrix when the signal series is subjected to the orthogonal conversion by using the orthogonal matrix at the time of sending data.

Furthermore, in the aforementioned embodiment, there is described a case in which QPSK modulation is used as the modulation method for the sent data. However, the present invention is not limited thereto. Other modulation method such as BPSK modulation (Binary Phase Shift Keying), 16 QAM modulation (16 Quadrature Amplitude Modulation) may be used.

Furthermore, in the aforementioned embodiment, there is described a case in which the present invention is applied to a radio communication system of the communication method such that the signal series is dissipated to a plurality of multiple carriers and is overlapped to send the resulting sending signal to the predetermined channel by converting the frequency, and at the same time, the channel of the sending signal is changed at random for each predetermined timing. However, the present invention is not limited thereto. The present invention may be applied to the radio communication system of the other communication. In summary, when there is a possibility that the so-called same channel interference is generated in which the same channel is used to perform at least two or more communications so that two or more communication electronic waves interfere with each other.

As described above, according to the present invention, the orthogonal matrix which is different for each communication is multiplied with the signal series and sent, and the receiving side restores the signal series before the orthogonal conversion by multiplying the inverse matrix of the orthogonal matrix which is used on the sending side of the communication partner with the received signal series. As a consequence, the other communication is performed by using the same channel so that even when the signal series is received the diagonal reverse conversion is not realized even by multiplying the inverse matrix to the signal series because the orthogonal matrix which is used in the orthogonal conversion is different from the other communication, and the signal series which is used in the other communication is not restored. By doing so, even when the same channel is used in the other communication, it is possible to avoid in advance mistaken restoration of the signal series which is sent in the other communication.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmitting method comprising the steps of:

selecting one of a plurality of orthogonal conversions to perform on a desired information;

performing the selected orthogonal conversion on the desired information, the selected orthogonal conversion being different for each of a plurality of situations, wherein the orthogonal conversion is performed by multiplying a random $N^{th}$ normal orthogonal matrix, M, formed by giving a random phase rotation to a Walsh vector by using the formula:

$$M = \frac{1}{\sqrt{N}} \begin{bmatrix} e^{jZ1} \, W_1^T \\ e^{jZ2} \, W_2^T \\ \vdots \\ e^{jZN} \, W_N^T \end{bmatrix}$$

wherein $e^{jz1}$, $e^{jz2}$, . . . $e^{jzn}$ are random phase rotation components, Z1, Z2 . . . ZN are phase rotation angles, and $W_1^T \, W_2^T \ldots W_N^T$ are transposed Walsh vectors; and transmitting a signal corresponding to the orthogonally converted information on which the selected orthogonal conversion has been performed.

2. The transmitting method according to claim 1, wherein the orthogonal conversion is performed by multiplying an orthogonal matrix.

3. The transmitting method according to claim 1, further comprising the step of dividing a predetermined number of the desired information into groups, wherein orthogonal conversion is performed for each group.

4. The transmitting method according to claim 3, wherein the orthogonal conversion is performed by multiplying an orthogonal matrix.

5. The transmitting method according to claim 2, wherein said orthogonal matrix is selected at random from a plurality of orthogonal matrixes.

6. The transmitting method according to claim 4, wherein said orthogonal matrix is selected at random from a plurality of orthogonal matrixes.

7. The transmitting method according to claim 1, wherein said random orthogonal matrix is obtained by rearranging each vector component of a predetermined orthogonal matrix at random.

8. A receiving method comprising the steps of:

receiving a receiving signal on which an orthogonal conversion has been applied on a transmission side;

performing on the receiving signal an inverse conversion to the orthogonal conversion which has been applied at a time of transmission, said orthogonal conversion being different for each of a plurality of situations, wherein the orthogonal conversion is performed by multiplying a random $N^{th}$ normal orthogonal matrix formed by giving a random phase rotation to a Walsh vector by using the formula:

$$M = \frac{1}{\sqrt{N}} \begin{bmatrix} e^{jZ1} & W_1^T \\ e^{jz2} & W_2^T \\ \vdots \\ e^{jZN} & W_N^T \end{bmatrix}$$

wherein $e^{jZ1}$, $e^{jZ2}$, ... $e^{jZN}$ are random phase rotation components, Z1, Z2 ... ZN are phase rotation angles, and $W_1^T$, $W_2^T$, ... $W_N^T$ are transposed Walsh vector.

9. The receiving method according to claim 8, wherein said orthogonal conversion is performed by multiplying an orthogonal matrix.

10. The receiving method according to claim 8, wherein a predetermined number of desired information is divided into groups at said transmission side, and said orthogonal conversion is performed for each group.

11. The receiving method according to claim 10, wherein said orthogonal conversion is performed by multiplying an orthogonal matrix.

12. The receiving method according to claim 9, wherein said orthogonal matrix is selected at random from a plurality of orthogonal matrixes.

13. The receiving method according to claim 11, wherein is selected at random from a plurality of orthogonal matrixes.

14. The receiving method according to claim 8, wherein said random orthogonal matrix is obtained by rearranging each vector component of a predetermined orthogonal matrix at random.

15. A transmitter for performing an orthogonal conversion on a desired information and transmitting the converted information, comprising:

orthogonal converting means for performing said orthogonal conversion on a desired information and supplying an output corresponding to the orthogonally converted information; and transmitting means for transmitting the output of said orthogonal converting means, wherein said orthogonal conversion is different for each of a plurality of situations, and the orthogonal conversion is performed by multiplying a random $N^{th}$ normal orthogonal matrix, M, formed by giving a random rotation to a Walsh vector by using the formula:

$$M = \frac{1}{\sqrt{N}} \begin{bmatrix} e^{jZ1} & W_1^T \\ e^{jz2} & W_2^T \\ \vdots \\ e^{jZN} & W_N^T \end{bmatrix}$$

wherein $e^{jz1}$, $e^{jz2}$, ... $e^{jzn}$ are random phase rotation components, Z1, Z2 ... ZN are phase rotation angles, and $W_1^T$, $W_2^T$, ... $W_N^T$ are transposed Walsh vectors.

16. The transmitter according to claim 15, wherein said orthogonal conversion is performed by multiplying an orthogonal matrix.

17. The transmitter according to claim 15, wherein said orthogonal converting means divides a predetermined number of said desired information into groups, and said orthogonal conversion is performed for each group.

18. The transmitter according to claim 17, wherein said orthogonal conversion is performed by multiplying an orthogonal matrix.

19. The transmitter according to claim 16, wherein said orthogonal matrix is selected at random from a plurality of orthogonal matrixes.

20. The transmitter according to claim 18, wherein said orthogonal matrix is selected at random from a plurality of orthogonal matrixes.

21. The transmitter according to claim 15, wherein said random orthogonal matrix is obtained by rearranging each vector component of a predetermined orthogonal matrix at random.

22. A receiver for receiving a receiving signal on which an orthogonal conversion has been applied and performing on the receiving signal an inverse conversion to the orthogonal conversion which has been applied at a time of transmission, comprising:

receiving means for receiving the receiving signal and supplying the receiving signal as an output; and inverse converting means for performing on the output of said receiving means the inverse conversion to the orthogonal conversion applied at the time of transmission, wherein said orthogonal conversion is different for each of a plurality of situations, and the orthogonal conversion is performed by multiplying a random $N^{th}$ normal orthogonal matrix, M, formed by giving a random phase rotation to a Walsh vector by using the formula:

$$M = \frac{1}{\sqrt{N}} \begin{bmatrix} e^{jZ1} & W_1^T \\ e^{jz2} & W_2^T \\ \vdots \\ e^{jZN} & W_N^T \end{bmatrix}$$

wherein $e^{jz1}$, $e^{jz2}$, ... $e^{jzn}$ are random phase rotation components, Z1, Z2 ... ZN are phase rotation angles, and $W_1^T W_2^T ... W_N^T$ are transposed Walsh vectors.

23. The receiver according to claim 16, wherein said orthogonal conversion is performed by multiplying an orthogonal matrix.

24. The receiver according to claim 16, wherein a predetermined number of said desired information is divided into groups, and said orthogonal conversion is performed for each group.

25. The receiver according to claim 24, wherein said orthogonal conversion is performed by multiplying an orthogonal matrix.

26. The receiver according to claim 23, wherein said orthogonal matrix is selected at random from a plurality of orthogonal matrixes.

27. The receiver according to claim 25, wherein said orthogonal matrix is selected at random from a plurality of orthogonal matrixes.

28. The receiver according to claim 22, wherein said random orthogonal matrix is obtained by rearranging each vector component of a predetermined orthogonal matrix at random.

29. A transmitting method for performing an orthogonal conversion on a desired information and transmitting the converted information, comprising the steps of:
applying a first modulation to the desired information;
performing the orthogonal conversion which is different for each of a plurality of situations on the information, wherein the orthogonal conversion is performed by multiplying a random $N^{th}$ normal orthogonal matrix, M, formed by giving a random phase rotation to a Walsh vector by using the formula:

$$M = \frac{1}{\sqrt{N}} \begin{bmatrix} e^{jZ1} & W_1^T \\ e^{jz2} & W_2^T \\ \vdots \\ e^{jZN} & W_N^T \end{bmatrix}$$

wherein $e^{jz1}$, $e^{jz2}$, ... $e^{jzn}$ are random phase rotation components, Z1, Z2 ... ZN are phase rotation angles, and $W^T_1 W^2_T ... W^N_T$ are transposed Walsh vectors;
applying a second modulation to the information; and
transmitting the information which has been processed by said first and second modulations and said orthogonal conversion.

30. The transmitting method according to claim 29, wherein said second modulation is a multiple carrier modulation.

31. The transmitting method according to claim 30, wherein said first modulation is a phase modulation.

32. The transmitting method according to claim 29, wherein
said second modulation is a CDMA modulation.

33. The transmitting method according to claim 30, wherein
said orthogonal conversion is performed by multiplying an orthogonal matrix.

34. The transmitting method according to claim 32, wherein
said orthogonal conversion is performed by multiplying an orthogonal matrix.

35. A receiving method for receiving a receiving signal on which an orthogonal conversion has been applied and performing on the receiving signal an inverse conversion to the orthogonal conversion which has been applied at a time of transmission, comprising the steps of:
receiving a receiving signal;
applying to the receiving signal a first demodulation for demodulating a first modulation applied at a time of transmission;
performing on the receiving signal the inverse conversion to the orthogonal conversion which is applied at a time of transmission and which is different for each of a plurality to situations, wherein the orthogonal conversion is performed by multiplying a random $N^{th}$ normal orthogonal matrix, M, formed by giving a random phase rotation to a Walsh vector by using the formula:

$$M = \frac{1}{\sqrt{N}} \begin{bmatrix} e^{jZ1} & W_1^T \\ e^{jz2} & W_2^T \\ \vdots \\ e^{jZN} & W_N^T \end{bmatrix}$$

wherein $e^{jz1}$, $e^{jz2}$, ... $e^{jzn}$ are random phase rotation components, Z1, Z2 ... ZN are phase rotation angles, and $W^1_T W^2_T ... W^N_T$ are transposed Walsh vectors; and applying to the receiving signal a second demodulation for demodulating a second demodulation applied at a time of transmission.

36. The receiving method according to claim 35, wherein said first modulation is a multiple carrier modulation.

37. The receiving method according to claim 36, wherein said second modulation is a phase modulation.

38. The receiver method according to claim 35, wherein said first modulation is a CDMA modulation.

39. The receiving method according to claim 36, wherein said orthogonal conversion is performed by multiplying an orthogonal matrix.

40. The receiving method according to claim 38, wherein said orthogonal conversion is performed by multiplying an orthogonal matrix.

41. A transmitter for performing an orthogonal conversion on a desired information and transmitting the converted information, comprising:
first modulating means for applying a first modulation to the desired information;
orthogonal converting means for performing on the modulated desired information the orthogonal conversion which is different for each of a plurality of situations, wherein the orthogonal conversion is performed by multiplying random $N^{th}$ normal orthogonal matrix, M, formed by giving a random phase rotation to a Walsh vector by using the formula:

$$M = \frac{1}{\sqrt{N}} \begin{bmatrix} e^{jZ1} & W_1^T \\ e^{jz2} & W_2^T \\ \vdots \\ e^{jZN} & W_N^T \end{bmatrix}$$

wherein $e^{jz1}$, $e^{jz2}$, ... $e^{jzn}$ are random phase rotation components, Z1, Z2 ... ZN are phase rotation angles, and $W^1_T$ $W^2_T$ ... $W^N_T$ are transposed Walsh vectors;

second modulating means for applying a second modulation to the desired information on which the orthogonal conversion has been performed; and transmitting means for transmitting the information on which said first and second modulation has been applied and said orthogonal conversion has been performed.

42. The transmitter according to claim 41, wherein said second modulation is a multiple carrier modulation.

43. The transmitter according to claim 42, wherein said first modulation is a phase modulation.

44. The transmitter according to claim 41, wherein said second modulation is a CDMA modulation.

45. The transmitter according to claim 42, wherein said orthogonal conversion is performed by multiplying an orthogonal matrix.

46. The transmitter according to claim 44, wherein said orthogonal conversion is performed by multiplying an orthogonal matrix.

47. A receiver for receiving a receiving signal on which an orthogonal conversion has been applied and performing on the receiving signal an inverse conversion to the orthogonal conversion which is applied at a time of transmission, comprising:

receiving means for receiving the receiving signal and supplying the signal as an output;

first demodulating means for applying to the output of said receiving means a first demodulation for demodulating a first modulation applied at a time of transmission and supplying a result of said first demodulation as an output;

orthogonal converting means for performing on the output of said first demodulating means the inverse conversion to the orthogonal conversion which is applied at a time of transmission and which is different for each of a plurality of situations and supplying the signal on which the inversion conversion has been performed as an output, wherein the orthogonal conversion is performed by multiplying a random $N^{th}$ normal orthogonal matrix, M, formed by giving a random phase rotation to a Walsh vector by using the formula:

$$M = \frac{1}{\sqrt{N}} \begin{bmatrix} e^{jZ1} & W_1^T \\ e^{jz2} & W_2^T \\ \vdots \\ e^{jZN} & W_N^T \end{bmatrix}$$

wherein $e^{jz1}$, $e^{jz2}$, ... $e^{jzn}$ are random phase rotation components, Z1, Z2 ... ZN are phase rotation angles, and $W^1_T$ $W^2_T$ ... $W^N_T$ are transposed Walsh vectors; and demodulating means for applying to the output of said orthogonal converting means a second demodulation for demodulating a second modulation applied at a time of transmission.

48. The receiver according to claim 47, wherein said first modulation is a multiple carrier modulation.

49. The receiver according to claim 48, wherein said second modulation is a phase modulation.

50. The receiver according to claim 47, wherein said first modulation is a CDMA modulation.

51. The receiver according to claim 48, wherein said orthogonal conversion is performed by multiplying an orthogonal matrix.

52. The receiver according to claim 50, wherein said orthogonal conversion is performed by multiplying an orthogonal matrix.

* * * * *